US012772300B2

(12) United States Patent
Barberis et al.

(10) Patent No.: US 12,772,300 B2
(45) Date of Patent: Oct. 20, 2026

(54) METHOD AND SYSTEM FOR EXPLOITING MILLIMETER-WAVE CONNECTIONS

(71) Applicant: TELECOM ITALIA S.p.A., Milan (IT)

(72) Inventors: Sergio Barberis, Turin (IT); Giorgio Calochira, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 796 days.

(21) Appl. No.: 17/778,994

(22) PCT Filed: Dec. 10, 2020

(86) PCT No.: PCT/EP2020/085421
§ 371 (c)(1),
(2) Date: May 23, 2022

(87) PCT Pub. No.: WO2021/116245
PCT Pub. Date: Jun. 17, 2021

(65) Prior Publication Data

US 2023/0354442 A1 Nov. 2, 2023

(30) Foreign Application Priority Data

Dec. 13, 2019 (IT) ........................ 102019000024000

(51) Int. Cl.
*H04W 76/10* (2018.01)
*H04W 64/00* (2009.01)

(52) U.S. Cl.
CPC ........... *H04W 76/10* (2018.02); *H04W 64/00* (2013.01)

(58) Field of Classification Search
CPC ..... H04W 76/10; H04W 64/00; H04W 4/029; H04W 4/24; H04W 76/16; H04W 76/18; H04W 4/024; H04B 7/0695
See application file for complete search history.

(56) References Cited

U.S. PATENT DOCUMENTS

2013/0065587 A1* 3/2013 Hong .................... H04W 48/18 455/435.2
2019/0208564 A1* 7/2019 Peng .................... H04W 24/04
(Continued)

FOREIGN PATENT DOCUMENTS

CN 102202421 A * 9/2011
WO WO 2018/033136 A1 2/2018

OTHER PUBLICATIONS

International Search Report issued Feb. 3, 2021 in PCT/EP2020/085421, filed on Dec. 10, 2020, 5 pages.
(Continued)

*Primary Examiner* — Yuwen Pan
*Assistant Examiner* — Fatuma G Sherif
(74) *Attorney, Agent, or Firm* — Oblon, McClelland, Maier & Neustadt, L.L.P.

(57) ABSTRACT

A method for exchanging digital content includes (i) determining a position of a connectable device; (ii) causing the connectable device and a first base station to attempt to establish a wireless communication link in a first frequency band therebetween; (iii) if the wireless communication link in the first frequency band has been successfully established, causing the first base station to exchange the digital content with the connectable device through the established wireless communication link in the first frequency band; (iv) prompting a user of the connectable device to change the position of the connectable device, if no wireless communication link in the first frequency band has been successfully established, and (v) after step (iv), performing steps (ii) and (iii).

13 Claims, 5 Drawing Sheets

(56) References Cited

U.S. PATENT DOCUMENTS

| | | | | |
|---|---|---|---|---|
| 2020/0267727 | A1* | 8/2020 | Humbert | H04W 72/0453 |
| 2021/0029662 | A1* | 1/2021 | Son | H04W 76/14 |

OTHER PUBLICATIONS

Written Opinion issued Feb. 3, 2021 in PCT/EP2020/085421, filed on Dec. 10, 2020, 9 pages.
Anonymous, "Come migllorare la ricezione del segnale cellulare", Navigaweb.net, XP055703645, May 13, 2019, 4 pages.

* cited by examiner

METHOD AND SYSTEM FOR EXPLOITING MILLIMETER-WAVE CONNECTIONS

BACKGROUND OF THE INVENTION

Field of the Invention

The present invention generally relates to wireless communication networks. Particularly, the present invention relates to wireless communication networks having millimeter-wave (mmW) connection capabilities. More particularly, the present invention relates to a method and system for exploiting mmW connections in such wireless communication systems.

Overview of the Related Art

The growing demand for mobile data services along with the scarcity of spectrum in the sub-6 GHz frequency band (or cellular band) has given rise to the recent interest in developing wireless communication systems that can exploit the large amount of spectrum available in the mmW frequency band (or mmW band).

Due to its potential for multi-gigabit and ultra-low latency communication links, technologies exploiting the mmW band are expected to play a role in 5th Generation (5G) cellular networks and beyond.

Radio propagation over a wireless communication link in the mmW band (or mmW wireless communication link, or mmW communication link) is particularly sensitive to the presence of obstacles that can severely impair transmission of signals or data (such as digital contents) to/from a mmW-enabled user device. Examples of obstacles may comprise buildings, walls, foliage, and human presence.

As disclosed in T. Wu, T. S. Rappaport, C. M. Collins, "*Safe for generations to come*", IEEE Microwave Magazine, vol. 16, no. 2, pp. 65-84, March 2015, other examples of obstacles may comprise everyday objects that, in daily use, are typically near the mmW-enabled user device (such as garments, keys, laptops): these objects, considered alone, may cause a non-relevant attenuation to signals or data exchanged over the mmW communication link (e.g., an attenuation below 3 dB), however the attenuations due to a number of these objects may sum up, which may prevent signal transmission/reception or signal transmission/reception with a minimum desired quality (e.g., in terms of "Bit Error Rate" (BER)).

Just as an example, if the mmW-enabled user device is placed in a container (such as a pocket, a bag, a backpack, or a briefcase), it could be out of reach (or below the minimum desired quality) of any mmW transmission, e.g. due to the attenuation introduced by the materials of the additional layers of which this container is made and/or to the attenuation introduced by the materials of any other object stored in the container together with the mmW-enabled user device. The aforementioned drawbacks are exacerbated in crowded environments where many obstacles may threaten the positive outcome of the transmission.

US2018302138 discloses a wireless communication apparatus including a first antenna circuit that forms a beam selected from among a plurality of first beams through a beamforming process performed for communication using a millimeter wave band, and a monitor that displays a first pattern indicating a radiation direction of the selected beam.

WO2018116701 discloses that a connection possibility assessment unit assesses whether it is possible to connect to a content distribution device in a millimeter wave band. If it has been assessed as a result of the connection possibility assessment that connection is possible, then, between a time point at which content-to-be-downloaded is selected and a time point at which download is requested of the selected content-to-be-downloaded, a request signal generation unit generates a connection request signal for requesting connection to the content distribution device in a millimeter wave band and transmits the connection request signal to the content distribution device via a millimeter wave wireless unit. A control unit downloads the content-to-be-downloaded from the content distribution device via the millimeter wave wireless unit.

SUMMARY OF INVENTION

The Applicant has found that none of the solutions known in the art is satisfactory.

In particular, the Applicant has found that none of the solutions known in the art teaches how to effectively handle exchange of digital contents over a mmW communication link in presence of fixed and/or variable obstacles.

The Applicant has faced the above-mentioned issues, and has devised a method and system for dynamically allowing digital content exchange over a mmW communication link or over a wireless communication link other than (i.e., different from) the mmW communication link.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for exchanging a digital content between a communication system and a connectable device connected thereto. The communication system comprises a first base station configured to exchange the digital content over wireless communication links in a first frequency band, the frequencies of the first frequency band being higher than or equal to 6 GHz. The communication system comprises a second base station configured to exchange the digital content over wireless communication links in a second frequency band, the frequencies of the second frequency band being lower than 6 GHz. The method comprises:

(i) determining a position of the connectable device;

(ii) causing the connectable device and the first base station to attempt to establish a wireless communication link in the first frequency band therebetween;

(iii) if the wireless communication link in the first frequency band has been successfully established, causing the first base station to exchange the digital content with the connectable device through the established wireless communication link in the first frequency band;

(iv) prompting a user of the connectable device to change the position of the connectable device, if no wireless communication link in the first frequency band has been successfully established, and (v) after step (iv), performing steps (ii) and (iii).

According to an embodiment, additional or alternative to any of the preceding embodiments, the method further comprises reiterating step (ii) until:

the wireless communication link in the first frequency band is established or a predetermined time period has elapsed.

According to an embodiment, additional or alternative to any of the preceding embodiments, the method further comprises reiterating said steps (iv) and (v) until:

a threshold number of iterations has been reached.

According to an embodiment, additional or alternative to any of the preceding embodiments, the method further comprises, if the threshold number of iterations has been reached and no wireless communication link in the first frequency band has been successfully established, causing the connectable device and the second base station to establish a wireless communication link in the second frequency band and causing the second base station to exchange the digital content with the connectable device through the established wireless communication link in the second frequency band.

According to an embodiment, additional or alternative to any of the preceding embodiments, said step (v) comprises performing step (i) before steps (ii) and (iii).

According to an embodiment, additional or alternative to any of the preceding embodiments, said step (ii) is performed after a determination that, according to the position of the connectable device determined at step (i), and according to historical information about historical wireless communication links in the first frequency band in that position, a successful wireless communication link in the first frequency band is expected to be established between the connectable device and the first base station.

According to an embodiment, additional or alternative to any of the preceding embodiments, the method further comprises:

if, according to the position of the connectable device determined at step (i), and according to the historical information about historical wireless communication links in the first frequency band in that position, no successful wireless communication link in the first frequency band is expected to be established between the connectable device and the first base station:

performing said prompting the user of the connectable device to change the position of the connectable device, and performing steps (ii) and (iii).

According to an embodiment, additional or alternative to any of the preceding embodiments, for each position, the historical information comprises an indication about historical successful wireless communication links in the first frequency band that have been successfully established with the first base station in that position, and an indication about historical unsuccessful wireless communication links in the first frequency band that have been unsuccessfully established with that first base station in that position. A successful wireless communication link in the first frequency band is expected to be established between the connectable device and the first base station if a number of historical successful wireless communication links in the first frequency band in that position is higher than the number of historical unsuccessful wireless communication links in the first frequency band in that position by a predefined amount.

According to an embodiment, additional or alternative to any of the preceding embodiments, the digital content comprises one or both between:

a file available at a communication network of the communication system, and ready to be downloaded upon access by the connectable device to said communication network;

a file pushed to the connectable device upon a predetermined condition being met.

According to an embodiment, additional or alternative to any of the preceding embodiments, said step (i) comprises determining a current position of the connectable device or an upcoming position of the connectable device.

According to an embodiment, additional or alternative to any of the preceding embodiments, the wireless communication link in the first frequency band comprises at least one among:

a millimeter-wave communication link;

a submillimeter-wave communication link;

an optical communication link, such as an infrared, ultraviolet and/or visible light communication link, and a WiGig communication link.

According to an embodiment, additional or alternative to any of the preceding embodiments, the wireless communication link in the second frequency band comprises at least one among:

a cellular communication link, such as a cellular communication link established using one or more among UTRA, WCDMA, CDMA2000, GERAN, LTE, LTE-Advanced, and NR radio access technologies; and a Wi-Fi communication link.

According to an embodiment, additional or alternative to any of the preceding embodiments, the connectable device comprises:

a user device, such as a mobile phone, a smartphone, a tablet, a personal digital assistant (PDA), or a laptop computer, or an indoor and/or outdoor machine for industrial and/or domestic applications.

Another aspect of the present invention relates to a communication system for exchanging a digital content with a connectable device connected thereto. The communication system comprises:

a first base station configured to exchange the digital content over wireless communication links in a first frequency band, the frequencies of the first frequency band being higher than or equal to 6 GHz;

a second base station configured to exchange the digital content over wireless communication links in a second frequency band, the frequencies of the second frequency band being lower than 6 GHz;

a communication network configured to:

(i) determine a position of the connectable device;

(ii) cause the connectable device and the first base station to attempt to establish a wireless communication link in the first frequency band therebetween;

(iii) if the wireless communication link in the first frequency band has been successfully established, causing the first base station to exchange the digital content with the connectable device through the established wireless communication link in the first frequency band;

(iv) prompt a user of the connectable device to change the position of the connectable device, if no wireless communication link in the first frequency band has been successfully established, and (v) after step (iv), perform steps (ii) and (iii).

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
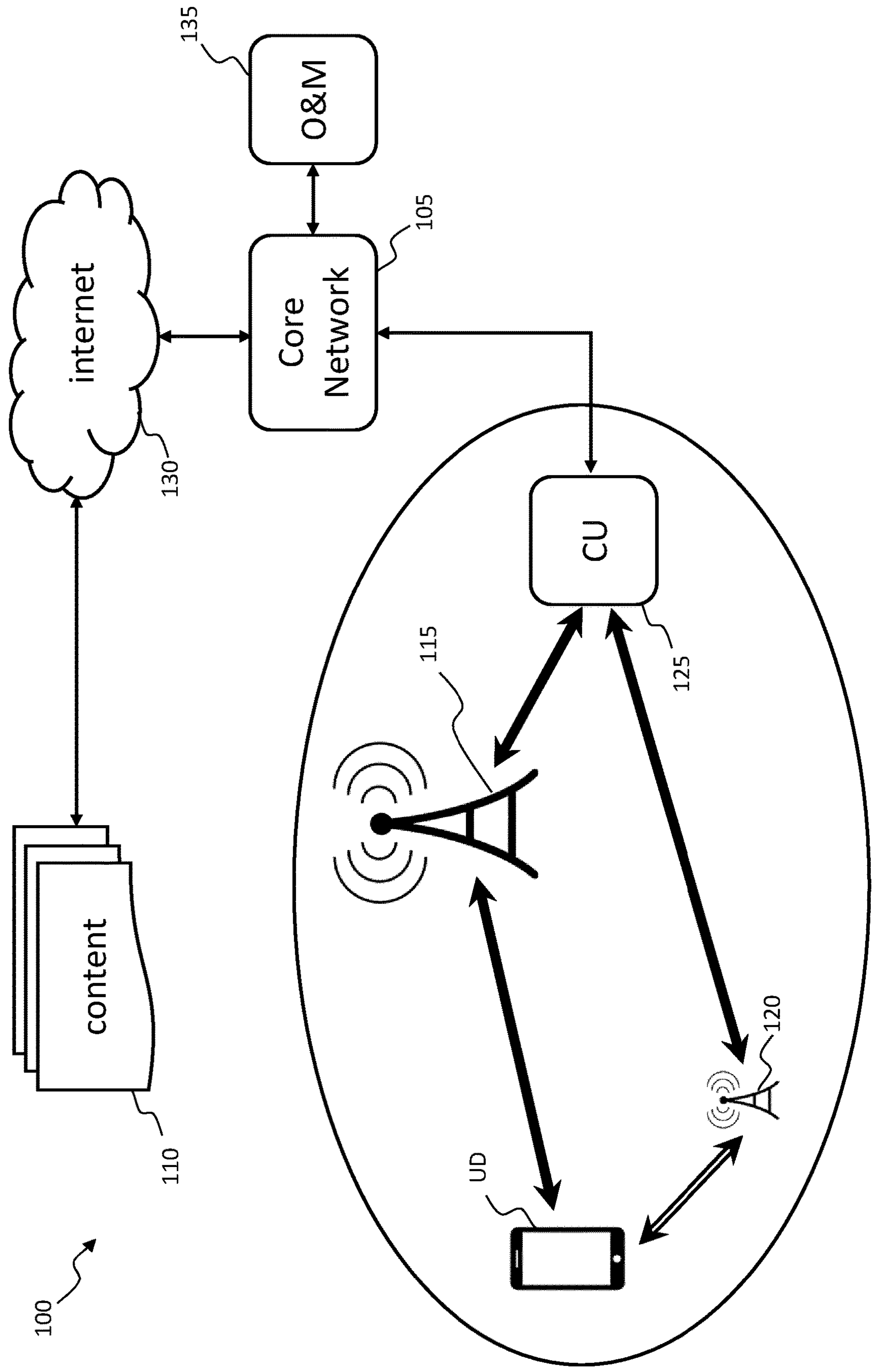
FIG. 1 shows a communication system according to an embodiment of the present invention.

FIG. 1 shows a communication system 100 according to an embodiment of the present invention.

In the following, when one or more features of the communication system 100 (as well as of a user device or other connectable device connected thereto, and of a procedure implemented by them) are introduced by the wording "according to an embodiment", they are to be construed as features additional or alternative to any features previously introduced, unless otherwise indicated and/or unless evident incompatibility among feature combinations.

The communication system 100 is configured to exchange signals and data carried thereon with one or more users connected to the communication system 100.

The data may for example comprise digital contents (such as voice, video, messaging and multimedia broadcast), hereinafter referred to as contents.

According to an embodiment, the communication system 100 is configured to exchange such signals with one or more connectable devices connected to the communication system 100.

By connectable device it is herein meant a device having multi-mode communication capabilities for communicating over different communication links. For the purposes of the present disclosure, by connectable device it is herein meant a device configured to communicate at least over a millimeter-wave communication link and over one or more other wireless communication links different from the millimeter-wave communication link (as better discussed in the following).

According to an embodiment, the connectable device(s) comprise(s) user device(s), such as the user device UD.

According to an embodiment, the communication system 100 is configured to exchange such signals with one or more users connected to the communication system 100 through the respective user devices, such as the user device UD.

According to an embodiment, the communication system 100 comprises a core network 105. The core network 105 may be any type of network configured to provide aggregation, authentication, call control/switching, charging, service invocation, gateway and subscriber database functionalities, or at least a subset (i.e., one or more) thereof.

Without losing generality, the core network 105 may for example be a 4G/LTE core network or a 5G core network.

According to an embodiment, the communication system 100 comprises a content provider 110 for content transmission/reception to/from the user device UD.

According to an embodiment, the communication system 100 comprises a base station 115.

The base station 115 is preferably configured to wirelessly interface with the user device UD to allow access thereof to the content provider 110 through one or more communication networks of the communication system 100, thereby allowing the user to receive the contents from the content provider 110 on his/her own user device UD. Examples of communication networks of the communication system 100 may comprise the core network 105 and the Internet network.

According to an embodiment, the base station 115 is configured to generate and exchange (i.e., transmit and/or receive) signals over cellular communication links. In the following, the signals over the cellular communication links (e.g., both for establishing the cellular communication links and for content exchange over the established cellular communication links) will be also referred to as cellular signals.

The cellular communication links may be established using any suitable radio access technology. Examples of radio access technologies comprise UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and NR ("New Radio").

Irrespective of the radio access technology, the frequency band of a cellular communication link (hereinafter referred to as cellular band) is typically below 6 GHz (sub-6 GHz frequency band)—see, for example, Tables 5.5-1 "E-UTRA Operating Bands" and 5.6.1-1 "E-UTRA Channel Bandwidth" of the latest published version of the 3GPP TS 36.101. for the purposes of the present disclosure, by sub-6 GHz frequency band it is intended that the frequencies of (i.e., included in) the sub-6 GHz frequency band are below 6 GHz.

According to an embodiment, the base station 115 comprises a relatively high-power transceiver station providing radio coverage over a relatively wide geographic area (also referred to as macro cell). Just as an example, in case the communication system 100 is based on the LTE/LTE-Advanced radio access technology, the base station 115 is or comprises an eNodeB.

Although not shown, the communication system 100 may comprise one or more additional base stations: for example, according to the radio access technology or technologies of the communication system 100, the additional base station (s) may be at least partially equivalent to or different from the base station 115.According to an embodiment, the base station 115 and/or the additional base station(s) may be configured to communicate over wireless communication links in the sub-6 GHz frequency band other than (i.e., different from) the cellular communication link.

Just as an non-exhaustive example, additionally or alternatively to the cellular signals, the base station 115 and/or the additional base station(s) may be configured to exchange radio signals over Wi-Fi radio access technology (the 802.11 standard provides distinct sub-6 GHz frequency bands for use in Wi-Fi radio access technology (such as 2.4 GHz and 5 GHZ), i.e. the base station 115 and/or the additional base station(s) may be configured to exchange signals over Wi-Fi communication links.

According to an embodiment, the communication system 100 comprises, e.g. within the macro cell, a base station 120.

According to an embodiment, the base station 120 comprises a lower-power, smaller coverage transceiver station.

According to an embodiment, the base station 120 is configured to exchange (i.e., transmit and/or receive) signals over millimeter-wave (mmW) wireless communication links (hereinafter, mmW communication links). In the following, the signals over the mmW communication links (e.g., both for establishing the mmW communication link and for content exchange over the established mmW communication link) will be also referred to as mmW signals, and the geographic area over which the base station 120 provides radio coverage will also referred to as mmW cell.

Millimeter waves are radio waves with wavelength in the range of 1 mm-10 mm, which corresponds to a frequency band (or mmW band) of 30 GHz-300 GHz (also referred to as "Extremely High Frequency" (EHF) band).

Although in the present disclosure the base station 120 is exemplary assumed to exchange mmW signals over mmW communication links, this should not be construed limitatively. Indeed, without losing generality, the base station 120 may be configured to exchange signals in any frequency bands above 30 GHz.

Just as a non-exhaustive example, additionally or alternatively to the mmW signals, the base station 120 may be configured to exchange radio signals over submillimeter-wave wireless communication links, i.e. the base station 120 may be configured to exchange radio signals over one or more submillimeter communication links. Submillimeter waves are radio waves with wavelength in the range of 0.1 mm to 1 mm, which corresponds to a frequency band of 300 GHz to 3 THz (also referred to as "Terahertz or Tremendously High Frequency" (THF) band).

Just as another non-exhaustive example, additionally or alternatively to mmW signals (and/or to the radio signals over submillimeter-wave wireless communication links), the base station 120 may be configured to exchange light signals, such as infrared (IR), visible (LiFi) and/or ultraviolet (UV) light signals, i.e. the base station 120 may be configured to exchange light signals over one or more optical communication links. The IR, LiFi and UV light signals are electromagnetic waves with wavelength in the range of 100 nm to 100 μm, which corresponds to a frequency band of 3 THz to 3 PHz.

Just as further non-exhaustive example, additionally or alternatively to mmW signals (and/or to the radio signals over submillimeter-wave wireless communication links and/or to the light signals), the base station 120 may be configured to exchange radio signals over WiGig (also referred to as 60 GHz Wi-Fi) communication links.

According to a basic embodiment, the base station 120 may be configured to exchange signals in any frequency band above 6 GHZ, i.e. an over-6 GHz frequency band (i.e., a frequency band whose frequencies are above 6 GHz), as opposed to the sub-6 GHz frequency band over which the base station 115 is configured to exchange signals. In any case, the 6 GHz frequency band should not be construed as a fixed frequency band discriminant or threshold, in that, according to the implemented radio access technologies, the base station 115 may be configured to exchange signals in a frequency band below a lower frequency band and the base station 120 may be configured to exchange signals in a frequency band above an upper frequency band, the upper frequency band being for example equal to or higher than the lower frequency band. Just as an example, the base station 115 may be configured to exchange signals in a frequency band below 10 GHz and the base station 120 may be configured to exchange signals in a frequency band above 10 GHZ, or above 20 GHz or above 30 GHz.

In the following, in accordance with the exemplary considered scenario in which the base station 115 is configured to transmit cellular signals over one or more cellular communication links and the base station is configured to transmit mmW signals over one or more mmW communication links, the base station 115 and the base station 120 will be referred to as cellular base station 115 and mmW base station 120, respectively.

According to an embodiment, the cellular base station 115 and the mmW base station 120 are part of the radio access network.

According to an embodiment, the radio access network architecture is split into two kinds of entities, i.e. a central unit (CU) 125 and one or more distributed units (DU) controlled by the central unit 125 to enhance the communication network flexibility.

According to an embodiment, the central unit 125 is configured to control the cellular base station 115 and the mmW base station 120, the cellular base station 115 and the mmW base station 120 thus acting as distributed units of the radio access network.

Just as an example, the central unit 125 may be an eNB CU or a ng-eNB CU depending on whether it is communicably coupled to a 4G/LTE core network or to a 5G Core network, respectively, the cellular base station 115 may be an eNB DU or a gNB DU depending on whether it is implemented according to LTE or NR radio access technologies, respectively, and the mmW base station 120 may be a gNB DU in that it is implemented according to NR radio access technology.

According to an embodiment, the radio access network may also comprise other base stations and/or network elements (not shown), for example remote radio units (RRU) that are integrated with the distributed units in FIG. 1. According to different embodiments CU, DU and RRU can be integrated/colocated or kept in different location (e.g., independent CU, DU, RRU, or colocated CU and DU, or RRU and DU integration, or CU, DU and RRU integration) as reported in ITU Technical Report "Transport network support of IMT-2020/5G".

According to an embodiment, the radio access network, and particularly the central unit 125 thereof, may be generally communicably coupled with one or more core networks, such as the core network 105. According to an embodiment, the core network 105 may be coupled with other networks, such as the Internet network 130.

In the exemplary considered embodiment, the content provider 110 is communicably coupled to the Internet network 130. Additionally or alternatively, the content provider 110 may be communicably coupled to any communication network. Moreover, although the content provider 110 has been exemplary illustrated as external to the communication networks, embodiments are not excluded in which the content provider 110, or at least a subset of functionalities thereof, is physically or logically located within one or more communication networks and/or other entities of the communication system 100.

For the purposes of the present disclosure, the central unit 125 is configured, e.g. under core network instructions, to route contents from the content provider 110 and available at the core network 105 to either the cellular base station 115 or to the mmW base station 120 (so as to allow content transmission to the user device through a cellular communication link or a mmW communication link, respectively).

According to an embodiment, the user device UD comprises multi-mode communication capabilities for communicating over different communication links. For the purposes of the present disclosure, the user device UD may be configured to communicate both with the mmW base station 120 over the mmW communication link and with the cellular base station 115 over the cellular communication link (or over any other wireless communication link different from the mmW communication link).

The user device UD may for example be a mobile phone, a smartphone, a tablet, a personal digital assistant (PDA), or a laptop computer, or any other portable or mobile device having processing, input/output and memory modules adapted to support different messaging protocols (such as push notifications), as well as to run software applications (e.g., mobile applications in the example at issue of a mobile device as user device UD).

The user device UD is associated with a user, the user being for example the owner of the user device UD. In the example at issue of a mobile device as user device UD, the user device UD and the associated user are assumed to be in the same position, whereby in the following reference will be indifferently made to position of the user or position of the user device UD.

According to an embodiment, not shown, the user device UD is communicably coupled to an external device provided with notification functionalities, i.e. a notification device, external to the user device UD, configured to deliver notification to the user in an immediate manner and with reduced human intervention. According to an embodiment, the external notification device comprises one or more wearable smart devices (such as a smartwatch, a wristband, a ring, in-ear headphones). As should be understood, when the user device UD is a device other than a smartphone (such as a laptop or a tablet), the external notification device may comprise a smartphone.

Figure 2:
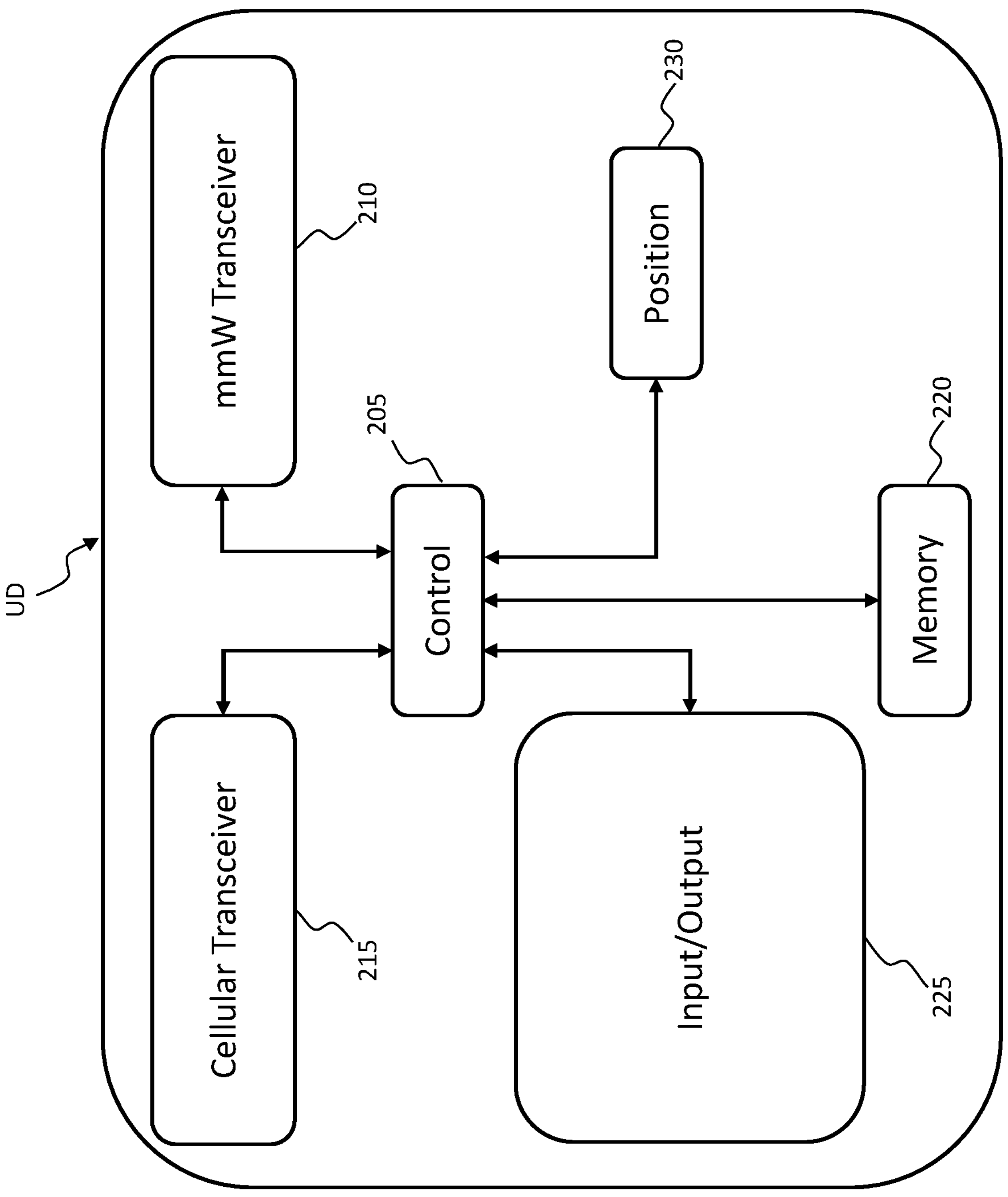
FIG. 2 shows main modules of a user device according to an embodiment of the present invention.

FIG. 2 shows main modules of the user device UD according to an embodiment of the present invention. The term "module" is herein intended to emphasize functional (rather than implementation) aspects thereof. Indeed, without losing generality, each module, according to its function, may be implemented by software, hardware, and/or a combination thereof. Moreover, the modules (or at least a subset thereof) may also reflect, at least conceptually, the physical structure of the user device UD. In any case, it will be appreciated that one or more of the illustrated modules may be integrated together in a single electronic package or chip.

For the sake of conciseness, only modules of the user device UD that are deemed relevant for the understanding of the present invention are shown in FIG. 2 and will be discussed here below, with other well-known modules and/or components of the user device UD that have been intentionally omitted.

According to an embodiment, the user device UD comprises a control module 205. The control module 205 is preferably configured to control an overall operation of the user device UD, e.g. by controlling the modules of the user device UD discussed here below, or at least a subset (i.e., one or more) thereof.

Just as an example, the control module 205 may perform signal coding, data processing, power control, input/output processing, and/or any other functionality enabling the user device UD to operate in a wireless environment.

According to an embodiment, the control module 205 comprises a processor. The processor may comprise a general purpose processor, a special purpose processor, a conventional processor, a digital signal processor (DSP), a microcontroller, ASIC ("Application Specific Integrated Circuit") circuits, FPGA ("Field Programmable Gate Array") circuits, or a combination thereof.

According to an embodiment, the user device UD comprises a transceiver module (hereinafter referred to as mmW transceiver module) 210 configured to transmit and receive mmW signals (i.e., signals over one or more mmW communication links).

The mmW transceiver module 210 may for example comprise an antenna system (not shown) for transmitting and receiving mmW signals, a receiver for converting the received mmW signals into baseband signals and demodulating them, and a transmitter for converting the baseband signals into mmW signals and transmitting them through the antenna system.

According to an embodiment, the user device UD comprises a transceiver module 215 configured to transmit and receive signals over a wireless communication link other than the mmW communication link. According to the exemplary considered embodiment, the transceiver module 215 is configured to transmit and receive cellular signals over one or more cellular communication links, whereby it will be referred to as cellular transceiver module 215.

The cellular transceiver module 215 may for example comprise an antenna system (not shown) for transmitting and receiving cellular signals, a receiver (not shown) for converting the received cellular signals into baseband signals and demodulating them, and a transmitter (not shown) for converting the baseband signals into cellular signals and transmitting them through the antenna system.

Additionally or alternatively to the cellular transceiver module 215, the user device UD may comprise one or more wireless transceiver modules (not shown) configured to exchange wireless signals (or combinations thereof) other than the cellular signals. Just as an example, the wireless transceiver module(s) may be configured to exchange light signals (such as infrared (IR), ultraviolet (UV) and/or visible light signals) and/or Wi-Fi signals.

According to an embodiment, the user device UD comprises a memory module 220. For the purposes of the present disclosure, the memory module 220 is preferably configured to store and run software applications (e.g., mobile applications in the example at issue of a mobile device as user device UD).

According to an embodiment, the memory module 220 comprises a non-removable memory (not shown). The non-removable memory may for example comprise a RAM ("Random-Access Memory") memory, and/or a ROM ("Read-Only Memory") memory, and/or a hard disk, and/or any other type of memory storage device.

According to an embodiment, the memory module 220 comprises a removable memory (not shown). The removable memory may for example comprise a SIM ("Subscriber Identity Module") card, and/or a memory stick, and/or a SD ("Secure Digital") memory card.

According to an embodiment, the user device UD comprises input/output modules 225 preferably configured to allow data input and output. The input/output modules may for example comprise one or more among a speaker/microphone, a keypad, and/or a display/touchpad.

According to an embodiment, the user device UD comprises a position module 230, which may for example be configured to provide position information regarding a position of the user device UD. The position information may for example comprise a geographic position of the user device UD. The geographic position may for example be expressed in terms of geographic coordinates (such as longitude, latitude and altitude).

According to an embodiment, the position module 230 comprises a GPS receiver, the position information for example comprising GPS signals received at the GPS receiver.

Additionally or alternatively, the user device UD may receive the position information (or at least a part thereof) from a base station (such as the cellular base station 115)

and/or determine the position of the user device UD based on the timing of signals received from two or more nearby base stations.

Additionally or alternatively, the user device UD may receive the position information (or at least a part thereof) from sensing devices (not shown) provided along one or more predefined paths that may be followed by the user: just as an example, the predefined path may be a guided touristic tour, or the predefined entrance/exit path to a train station or an airport terminal or a cruise terminal or a tourist attraction.

According to an embodiment, the position information comprises information regarding a current position of the user device UD.

According to an embodiment, the position information comprises information regarding an upcoming position of the user device UD. By upcoming position of the user device UD it is herein meant the position that the user device UD is expected to take after the current position. The upcoming position may for example be determined based on the predefined path the user device UD is following. According to an embodiment, the upcoming position is determined based on the predefined path and on a current stage the user is actually taking in the predefined path. The current stage may for example be determined based on the current position of the user device UD.

In the following, reference will be also made to a current/upcoming position of the user device UD when distinguishing between the current and upcoming positions of the user device UD is not relevant for the understanding of the present invention.

Although not shown, the user device UD may comprise peripherals modules (not shown), which may comprise one or more software and/or hardware modules that provide additional features, additional functionalities and/or additional wired or wireless connectivity. Just as an example, the additional peripherals may comprise one or more among an accelerometer, an e-compass, a satellite transceiver, a digital camera (for photographs or video), a USB ("Universal Serial Bus") port, a vibration device, a television transceiver, a Bluetooth module, a frequency modulated (FM) radio unit, a digital music player, a media player, a video game player module, an Internet browser, and the like.

Back to FIG. 1, according to an embodiment the communication system 100 comprises an Operation & Maintenance (O&M) module 135 communicably coupled to the core network 105.

According to an embodiment, the O&M module 135 is configured to gather, store and provide to the core network 105 information about historical mmW communication links (hereinafter, historical mmW information). According to alternative embodiments, the historical mmW information may be generated and stored at any entity external to the O&M module 135, the historical mmW information being for example generated and stored externally to the O&M module 135 based on data provided (e.g., periodically or aperiodically) by the O&M module 135.

According to an embodiment, the historical mmW information may comprise, for each position taken by user devices, outcomes (e.g., successful or unsuccessful) of past attempts (by the user devices) to connect to the mmW base station 120 for establishing a mmW communication link. In other words, the historical mmW information may comprise, for each position taken by the user devices during the past attempts to connect to the mmW base station 120, indications about historical mmW communication links successfully established with that mmW base station (or successful historical mmW communication links) and indications about historical mmW communication links unsuccessfully established with that mmW base station (or unsuccessful historical mmW communication links).

According to an embodiment, the communication system 100 is configured to implement a procedure or method aimed at managing communication links over which content transmission to/from the user device UD may take place (as better discussed here below).

The procedure may for example be carried out at the core network 105, or at an entity external to the core network 105 and communicably coupled to both the core network 105 and the O&M module 135.

Figure 3A:
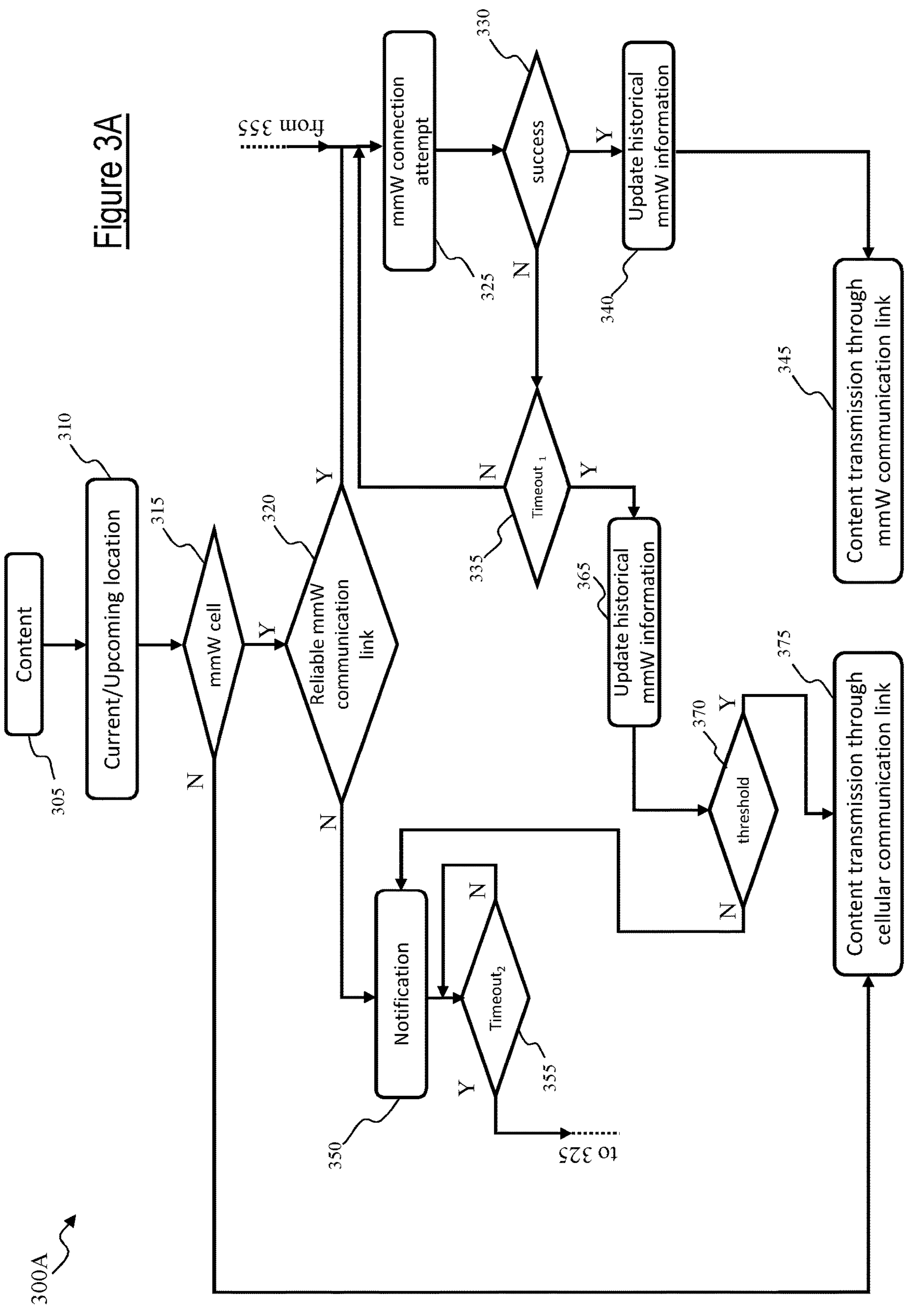
FIG. 3A shows a procedure according to an embodiment of the present invention.

FIG. 3A shows a procedure or method 300A according to an embodiment of the present invention.

Broadly speaking, the procedure 300A is aimed at managing (e.g., allowing or preventing) content exchange between the user device UD and the mmW base station 120 over the mmW communication link or between the user device and the cellular base station 115 over the cellular communication link. In the following, the practical case of a content to be transmitted to the user device UD will be considered by way of example only.

As mentioned above, the content may for example comprise voice, video, messaging and multimedia broadcast.

The content may have any size: however, as will be apparent from the following discussion, the procedure 300A is particularly advantageous when the content has a relatively large size (e.g., more than 0.5 GB).

According to a first exemplary content transmission scenario (hereinafter referred to as content download scenario), the content from the content provider 110 is a file (such as an e-mail attachment) available at a communication network (such as the core network 105 and the Internet network 130), and ready to be downloaded upon access by the user device UD to that communication network (e.g., upon access by the user device UD to the e-mail service). By content download it is herein meant the transmission of contents in response to the user actively (i.e., purposely) requesting it through his/her own user device UD.

According to a second exemplary content transmission scenario (hereinafter referred to as content push scenario), the content from the content provider 110 may be a file pushed to the user device UD (e.g., through a mobile application running on it) upon a predetermined condition being met. By content push it is herein meant the automatic (i.e., autonomous) transmission of contents by the communication network (such as the core network 105 and the Internet network 130) in response to the predetermined condition, whereby the user passively receives the content on his/her own user device UD upon the predetermined condition being met.

According to an embodiment, in the content push scenario the automatic (i.e., autonomous) transmission of contents by the communication network is authorized at a previous phase, such as a service registration phase.

According to an embodiment, the predetermined condition comprises a predetermined position that, when taken by the user device UD, triggers content push to the user device UD.

The predetermined position may for example be the current/upcoming position of the user device UD within a geographic area (for example, the macro cell identified by the cellular base station 115, or the current/upcoming position of the user device UD along one or more predefined paths the user device UD is following (such as a guided touristic tour, and/or a predefined entrance/exit path to a train station and/or an airport terminal and/or a cruise terminal or and/a tourist attraction).

In either or both cases, the user may for example download a corresponding mobile application on his/her user device UD (for example, a mobile application designed to guide the user along one or more predefined paths), perform the service registration phase (e.g., through the mobile application itself), authorize the mobile application (e.g., through the mobile application itself) to push notifications (hereinafter, notification authorization) and, preferably, to select (e.g., through the mobile application itself) one or more classes or types of contents to be notified, when available, to the user device UD.

According to an embodiment (not shown), the user may grant (confirm) or deny the notification authorization by touching or selecting a corresponding box during a configuration procedure of the mobile application. Additionally or alternatively, the user may grant (confirm) or deny the notification authorization at a later stage, e.g. at any time after the configuration procedure: just as an example, the user may grant (confirm) or deny the notification authorization by accessing a corresponding menu option of the user device UD and/or of the mobile application.

Back to the procedure 300A, reference will be generically made, by way of example only, to a content that has to be transmitted to the user device UD, irrespective of the considered content transmission scenario (e.g., content download scenario or content push scenario). As will be properly illustrated while discussing the procedure steps, some of the procedure steps may differ depending on the considered content transmission scenario.

According to an embodiment, the procedure 300A starts when a content that has to be transmitted from the content provider 110 to the user device UD is made available at the communication network (action node 305).

According to an embodiment, the position (e.g., the current/upcoming) of the user device UD is determined (action node 310).

According to an embodiment, the current/upcoming position of the user device UD is determined at user device side. As discussed above, the current/upcoming position of the user device UD may for example be based on position information received at the position module 230 of the user device UD.

According to an embodiment, the current/upcoming position of the user device UD is communicated to the core network 105, preferably through the cellular base station 115 (and the central unit 125).

According to an embodiment, when considering the content push scenario, the current/upcoming position of the user device UD may be already available at the core network 105 before the content from the content provider 110 is made available at the communication network (i.e., before action node), in that in such a scenario the current/upcoming position of the user device UD may have triggered content availability.

According to an embodiment, a check is performed (e.g., at the core network 105) for checking whether, e.g. according to the determined current/upcoming position of the user device UD, the user device UD is/will be within a mmW cell (decision node 315), for example in that a mmW base station with which a mmW communication link can be established for content transmission is available near the location of the user device UD.

According to an embodiment, if, according to the determined current/upcoming position of the user device UD, the user device UD is not/will not be within a mmW cell (exit branch N of the decision node 315), which means that no mmW base station with which a mmW communication link can be established for content transmission is available near the location of the user device UD, content transmission from the communication network to the user device preferably takes place through a cellular communication link (or through any wireless communication link other than the mmW communication link) established between the user device UD and the base station 115—action node 375. In other words, if, according to the determined current/upcoming position of the user device UD, the user device UD is not/will not be within a mmW cell, the cellular base station 115 is caused to transmit the content to the user device UD.

According to an embodiment, information about the progress of the content transmission is provided to the user, for example in the form of an advancement bar displayed on the user device UD.

According to an embodiment, if, according to the determined current/upcoming position of the user device UD, the user device UD is/will be within a mmW cell (exit branch Y of the decision node 315), which means that a mmW base station with which a mmW communication link can be established for content transmission is available near the location of the user device UD, a check is performed (e.g., at the core network 105) for checking a reliability of a mmW communication link in that current/upcoming position of the user device UD (decision node 320). By reliability of a mmW communication link it is herein meant the probability that a connection to the mmW base station (for establishing the mmW communication link) is successful.

According to an embodiment, the reliability of a mmW communication link in that current/upcoming position of the user device UD is checked (e.g., at the core network 105) based on the historical mmW information, or at least on a subset thereof, associated with that current/upcoming position (as discussed above, the historical mmW information being for example stored in the O&M module, or at any entity external thereto, and made available, on request, at the core network 105 or at any other entity running the procedure).

Just as an example, a mmW communication link in a current/upcoming position may be considered or classified as reliable if, e.g. based on the historical mmW information, the number of historical successful mmW communication links in that current/upcoming position is higher than the number of historical unsuccessful mmW communication links in that current/upcoming position.

Just as another example, a mmW communication link in a current/upcoming position may be considered or classified as reliable if, e.g. based on the historical mmW information, the number of historical successful mmW communication links is higher than the number of historical unsuccessful mmW communication links by a predefined amount: by way of example only, in case of equal or slightly different number of historical successful mmW communication links and of historical unsuccessful mmW communication links in a certain current/upcoming position, any mmW communication link between the user device UD in that current/upcoming position and the mmW base station may be considered or classified unreliable. According to an embodiment, such a condition of unreliability associated with a certain current/upcoming position may be removed (so as to restore such a current/upcoming position back to a reliable position) on a periodic or aperiodic basis.

Just as a further example, additional or alternative to any of the previous examples, a mmW communication link in a current/upcoming position may be considered or classified as reliable if no historical mmW information are available for that current/upcoming position, i.e. if no past attempts to establish a mmW communication link in that current/upcoming position have so far performed (the mmW communication link thus being a new communication link).

Back to the decision node 320, according to an embodiment, if, e.g. based on the historical mmW information, the mmW communication link in the current/upcoming position of the user device UD is reliable (exit branch Y of the decision node 320), i.e. a successful mmW communication link is expected to be established between the user device UD and the mmW base station 120, the user device UD is caused to perform a connection attempt to connect to the mmW base station 120 for establishing a mmW communication link therebetween (action node 325).

According to an embodiment, the mmW connection attempt is reiterated until a mmW communication link is established (successful mmW connection attempt) or a predetermined time period (denoted by "$\text{Timeout}_1$" in the figure) has elapsed, whichever condition occurs first. This is schematically illustrated in the figure by action 325 and decision 330, 335 nodes: the mmW connection attempt (action node 325) is repeated if no mmW communication link has (so far) been established (i.e., if any previous mmW connection attempt has failed) (exit branch N of decision node 330), and the predetermined time period $\text{Timeout}_1$ has not elapsed (exit branch N of the decision node 335).

According to an embodiment, if a mmW communication link has been established before the predetermined time period has elapsed (exit branch Y of the decision node 330), i.e. successful outcome of the mmW connection attempt(s), content transmission from the communication network to the user device UD preferably takes place through the mmW communication link so established between the user device UD and the mmW base station 120 (i.e., it is up to the mmW base station 120 to transmit the content to the user device UD)—action node 345.

According to an embodiment, information about the progress of the content transmission is provided to the user, for example in the form of an advancement bar displayed on the user device UD.

According to an embodiment, upon establishing of the mmW communication link (i.e., successful outcome of the mmW connection attempt(s)), the historical mmW information is accordingly updated (action node 340).

According to an embodiment, updating of the historical mmW information comprises adding the successful outcome of the mmW connection attempt(s) to an existing mmW communication link or adding the successful outcome of the mmW connection attempt(s) to a new (i.e., not yet existing) mmW communication link.

According to an embodiment, if no mmW communication link has been established (i.e., all mmW connection attempts so far performed have failed) upon elapsing of the predetermined time period $\text{Timeout}_1$ (exit branch N of the decision node 330 and exit branch Y of the decision node 335), and if (exit branch Y of decision node 370) a threshold number of reiterations has been reached (as discussed in the following, each reiteration comprising a notification to prompt the user device to move his/her own user device UD in a different position, and subsequent mmW connection attempts), content transmission from the communication network to the user device UD takes place through a cellular communication link (or through any wireless communication link in the sub-6 GHz frequency band other than the cellular communication link) established between the user device UD and the cellular base station 115—action node 375.

According to an embodiment, upon determining the failure of the mmW communication link (i.e., unsuccessful outcome of the mmW connection attempt(s)), the historical mmW information is accordingly updated (action node 365).

According to an embodiment, updating of the historical mmW information comprises adding the unsuccessful outcome of the mmW connection attempts to an existing mmW communication link or adding the unsuccessful outcome of the mmW connection attempts to a new (i.e., not yet existing) mmW communication link.

Back to the decision node 320, according to an embodiment, if, e.g. based on the historical mmW information, the mmW communication link in the current/upcoming position of the user device UD is considered unreliable (exit branch N of the decision node 320), i.e. no successful mmW communication link is expected to be established between the user device UD and the mmW base station 120, the user is caused (or induced or prompted) to change the position of the user device UD (action node 350).

According to an embodiment, in order to cause or induce the user to change the position of the user device UD, a notification is delivered (e.g., pushed) to the user device UD (action node 350). As mentioned above, additionally or alternatively the notification may be delivered (e.g., pushed) to one or more wearable smart devices associated with the user device UD. According to an embodiment, the notification is delivered (e.g., pushed) by the communication network to the user device UD through standard or non-standard messaging or by means of an application/service synchronization.

According to an embodiment, the notification (and, preferably, any other signalling before the mmW connection attempt(s)) is delivered by the communication network through the base station 115, i.e. through one or more cellular communication links (such as dedicated one or more cellular communication links). Therefore, according to embodiments of the present invention, the cellular signals (i.e. the signals in the lower, sub-6 GHz, frequency band) are exploited to try to have the user device UD proactively moved in a more suitable position for the reception of the mmW signals (i.e. the signals in the higher frequency band).

The notification may for example be a push notification, for example a banner on the top the smartphone screen, a pop up bubble or badge from the button task bar, a dialog box that interrupts and blocks the view of any front running application, and may contain text and/or vocal image message (possibly with the further playing of an alert sound to attract the attention of the user).

According to an embodiment, the notification comprises a message indicative that a content is available at the communication network and that it could be transmitted over a mmW communication link, whenever the propagation conditions of the mmW signals between the user device UD and the mmW base station 120 improve.

In response to this, the user may move his/her own user device UD in a different position that hopefully results in a successful mmW communication link.

According to an embodiment, the user is prompted to move his/her own user device UD in a different position essentially at his/her own discretion.

Altough it could be reasonably assumed that the user reaction to each notification is to move his/her own user device UD to a different position (especially at a first notification, when the user may have to grab his/her own user device UD from a pocket or a bag to see the notification), similar considerations apply when, in response to one or more of the notifications, the user does not move his/her own user device UD in a different position: indeed, meanwhile, any impediment having caused the failure of the mmW communication attempts so far performed, such as obstacles or temporary failures or faults in the mmW base station 120, may have been removed or adjusted (without requiring any position change of the user device UD).

According to an embodiment (not shown), the notification also comprises one or more authorization procedures. The authorization procedure(s) may for example comprise a content authorization procedure, i.e. a procedure for authorizing the content transmission to the user device UD (content authorization), and/or a mmW authorization procedure, i.e. a procedure for authorizing the content transmission to the user device UD through a mmW communication link (mmW authorization).

According to an embodiment (not shown), the user may grant (confirm) or deny content authorization and/or the user may grant (confirm) or deny mmW authorization. Just as an example, the content and/or mmW authorization may be granted by touching on the notification or by means of other gesture (for example, by means of a sliding on the notification box), whereas the content and/or mmW authorization may be denied by performing no action on (i.e., by ignoring) the notification.

According to an embodiment, the content authorization and/or the mmW authorization may considered granted if the gesture on the notification is performed within a prescribed time period, at the end of which the absence of actions on the notification may be interpreted as authorization denied.

The content authorization may be particularly (although not exclusively) advantageous in the content push scenario, e.g. so as to give to the user a certain degree of control on passive reception of contents on his/her own user device UD.

According to an embodiment, the content authorization procedure may take place when a content that has to be transmitted to the user device UD is made available at the communication network (action node 305).

The mmW authorization may be particularly (although not exclusively) advantageous both in the content push scenario and in the content download scenario, e.g. so as to give to the user a certain degree of control on user device parameters (such as power consumption) affected by the choice of the communication link over which allowing the content transmission.

Back to action node 350, according to an embodiment, a further predetermined time period (denoted by "$Timeout_2$" in the figure) is waited (decision node 355), during which the user may move his/her own user device UD in a different position. This is schematically illustrated in the figure by loop connection between the exit branch N of the decision node 355 (which means that the predetermined time period $Timeout_2$ has not yet elapsed) and the input thereof: as long as the predetermined time period $Timeout_2$ has not elapsed (exit branch N of the decision node 355), the user may change the position of the user device UD. According to an embodiment (not shown), as long as the predetermined time period $Timeout_2$ has not elapsed, the user is prompted to change the position of the user device by one or more further notifications.

According to an embodiment, the further notification(s) are analogous to the notification pushed at action node 350. Alternatively, the further notification(s) may differ from the notification pushed at action node 350 for sound and/or light and/or text indications.

According to an embodiment, not shown, a maximum number of the further notifications is set.

Additionally or alternatively, a signal from the user device UD indicative of a change in the position of the user device UD may trigger the mmW connection attempt(s) (action node 325) before the end (or elapsing) of the predetermined time period $Timeout_2$. This may for example be performed by exploiting one or more sensors of the user device UD, when provided. Just as an example, a signal from the user device UD indicative of a change in the position of the user device UD may be generated in response to user device acceleration and/or orientation changes being sensed by proper accelerometers and/or gyroscopes.

According to an embodiment, after the predetermined time period $Timeout_2$ has elapsed, during which the user may have moved his/her own user device UD in a different position, or upon a signal from the user device UD indicative of a change in the position of the user device UD, one or more further mmW connection attempts are performed (by the user device UD) to connect to the mmW base station 120 for establishing a mmW communication link (e.g., based on such a different position, if the user has actually moved his/her own user device UD). According to an embodiment, the further mmW connection attempt(s) are reiterated as discussed above in connection with action 325 and decision 330, 335 nodes: this is schematically illustrated in the figure by a connection between decision node 355 and action node 325.

Back to decision node 335, according to an embodiment, if no mmW communication link has been established (i.e., all mmW connection attempts so far performed have failed) upon elapsing of the predetermined time period $Timeout_1$ (exit branch N of the decision node 330 and exit branch Y of the decision node 335), the user is prompted to change the position of the user device UD and one or more mmW connection attempts are performed based on the changed position of the user device UD.

According to an embodiment, the user is prompted to change the position of the user device UD as discussed above in connection with action node 350 and decision node 355: a notification is delivered (e.g., pushed) to the user device UD (action node 350), in response to the notification (and within the predetermined time period $Timeout_2$—decision node 355) the user may move his/her own user device UD in a different position, and the mmW connection attempt (s) are reiterated (action 325 and decision 330, 335 nodes) for the changed position until a mmW communication link has been established (exit branch Y of the decision node 330) or the predetermined time period $Timeout_1$ has elapsed (exit branch Y of the decision node 335), whichever condition occurs first.

According to an embodiment, the notification(s) (action node 350), the waiting for changes in the position of the user device UD for the predetermined time period $Timeout_2$ (decision node 355), and the subsequent mmW connection attempt(s) (nodes 325-335) are reiterated until a mmW communication link is established (successful mmW connection attempt, exit branch Y of decision node 330) or a threshold number of reiterations has been reached (exit branch Y of decision node 370), whichever condition occurs first. This is schematically illustrated in the figure by loop connection between the decision node 370 and the action node 350: as long as the threshold number of iterations has not been reached (exit branch N of the decision node 370), the user is prompted (or induced) to change the position of the user device UD and mmW connection attempt(s) based on the changed position are performed.

According to an embodiment, not shown, after the user is prompted to move his/her own user device UD, the current/upcoming location of the user device UD may be (re) determined (action node 310) and the procedure 300A would be resumed as discussed above in connection with nodes 315-375: in other words, in this embodiment, the exit branch Y of the decision node 355 would be connected to action node 310 instead of action node 325. Thanks to this embodiment, a check is re (performed) to check whether the user device UD is/will be still within the mmW cell (decision node 315), in that the movement of the user/user device UD could result in a position that is outside the mmW cell.

Back to decision node 335, if the predetermined time period $Timeout_1$ has elapsed (exit branch Y of the decision node 335), which means an unsuccessful outcome of the mmW connection attempt(s) for the current position of the user device UD, the historical mmW information is accordingly updated (action node 365) and, if the threshold number of iterations has been reached (exit branch Y of the decision node 370), content transmission from the communication network to the user device UD takes place through a cellular communication link (or through any wireless communication link other than the mmW communication link) established between the user device UD and the cellular base station 115 (action node 375).

Figure 3B:
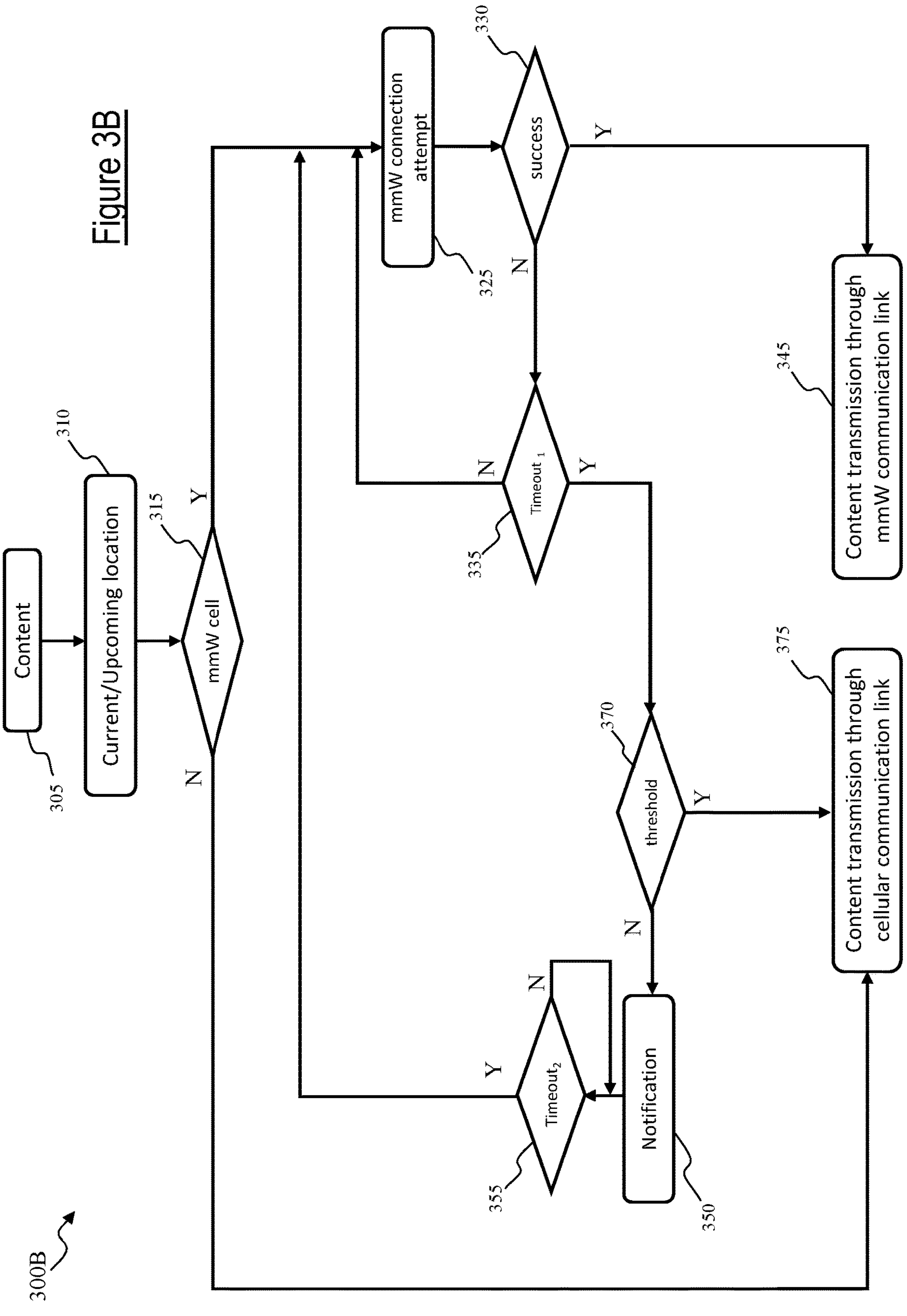
FIG. 3B shows a procedure according to another embodiment of the present invention.

With reference now to FIG. 3B, it shows a procedure 300B according to another embodiment of the present invention.

The procedure 300B is similar to the procedure 300A, reason why same procedure steps have been denoted by same number references and their explanation will not be repeated for the sake of conciseness.

The procedure 300B differs from the procedure 300A essentially in that no check is performed for checking the reliability of the mmW communication link in a current/upcoming position of the user device UD (i.e. no decision node 320 is provided in the activity diagram of FIG. 3B). Thus, in the embodiment of FIG. 3B, if, according to the determined current/upcoming position of the user device UD, the user device UD is/will be within a mmW cell (exit branch Y of the decision node 315), which means that a mmW base station with which a mmW communication link can be established for content transmission is available near the location of the user device UD, mmW connection attempts are performed (action node 325) until a mmW communication link is established (exit branch Y of decision node 330) or the predetermined time period "Timeout" has elapsed (exit branch Y of the decision node 335), whichever condition occurs first, and notifications (nodes 350 and 355) and subsequent mmW connection attempts are reiterated until a mmW communication link is established (exit branch Y of decision node 330) or the threshold number of iterations has been reached (exit branch Y of decision node 370), whichever condition occurs first.

The embodiment of FIG. 3B may for example be implemented when it is desired or required that the managing (or selection) of the communication links over which content transmission to/from the user device UD may take place is not based on historical mmW information. For this reason, no procedure step concerning the mmW historical information (such as the steps of storing/updating the mmW historical information at action nodes 340 and 365 of procedure 300A) is provided in the activity diagram of FIG. 3B.

Figure 3C:
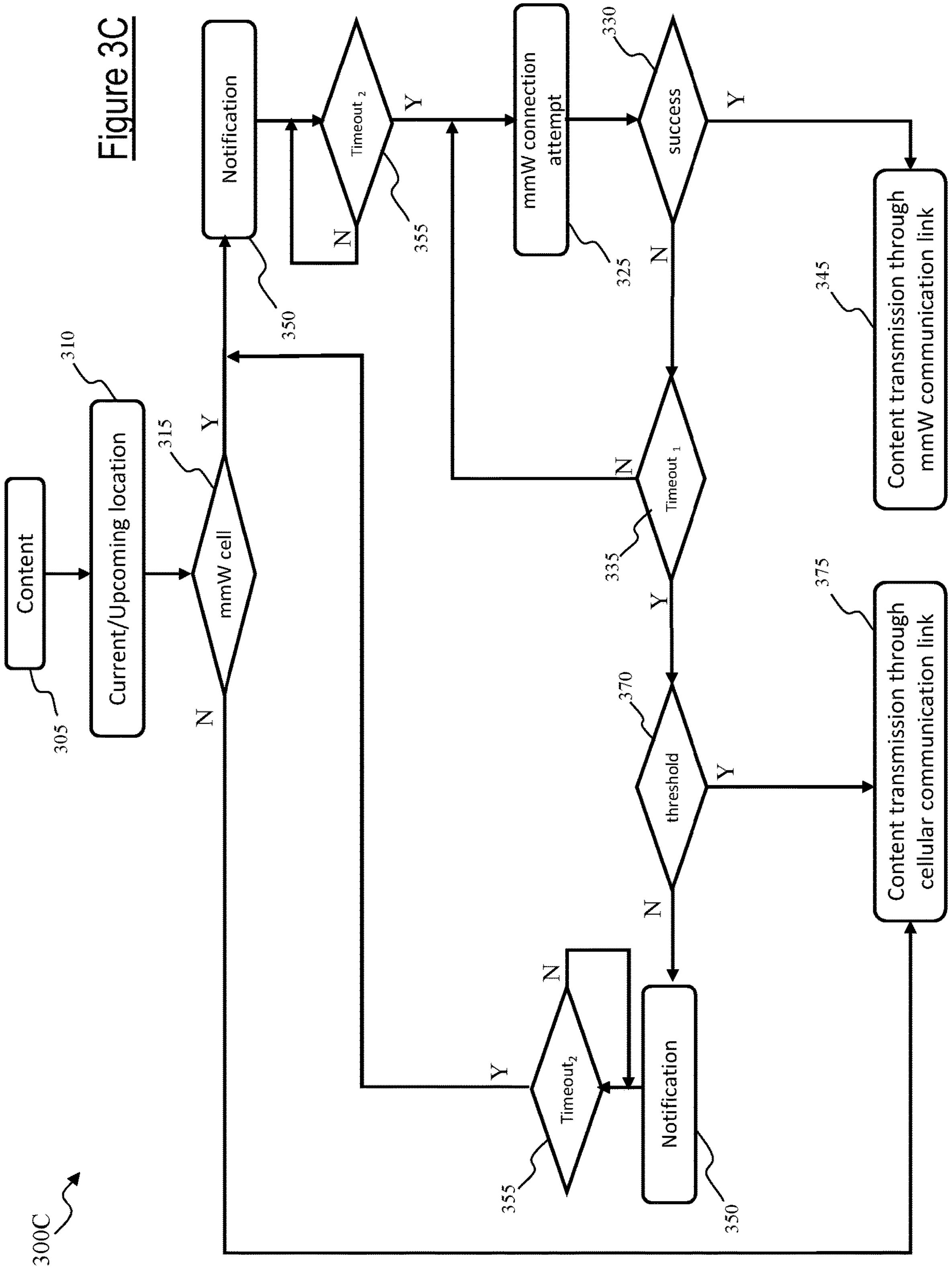
FIG. 3C shows a procedure according to another embodiment of the present invention.

With reference now to FIG. 3C, it shows a procedure 300C according to another embodiment of the present invention.

The procedure 300C is similar to the procedure 300B, reason why same procedure steps have been denoted by same number references and their explanation will not be repeated for the sake of conciseness.

The procedure 300C differs from the procedure 300B essentially in that the notification at action node 350 takes place before any mmW connection attempt. Thus, in the embodiment of FIG. 3C, if, according to the determined current/upcoming position of the user device UD, the user device UD is/will be within a mmW cell (exit branch Y of the decision node 315), a (first) notification is delivered (e.g., pushed) to the user device UD (action node 350) in order to inform the user of the availability of a mmW communication link, and, after the predetermined time period $Timeout_2$ has elapsed during which the user may grab his/her own user device UD to see the notification (exit branch Y of the decision node 355), the mmW connection attempt(s) are reiterated (action 325 and decision 330, 335 nodes) until a mmW communication link has been established (exit branch Y of the decision node 330) or the predetermined time period $Timeout_1$ has elapsed (exit branch Y of the decision node 335), whichever condition occurs first.

The embodiment of FIG. 3C may for example be implemented when it is desired or required that the user is immediately notified of the availability of a mmW communication link near the location of the user device UD. Moreover, in this embodiment the first notification may also be regarded as having a trigger function: indeed, the action of grabbing the user device UD (e.g., from a pocket or a bag) to see the notification inherently causes a movement of the user device UD to a different position—as should be understood, the trigger function of the first notification may also be envisaged in the embodiments of FIGS. 3A and 3B.

Similarly to the embodiments of FIGS. 3A and 3B, the procedure 300C may provide multiple iterations, for example each one starting with a respective notification to prompt the user to change the position of his/her own user device UD: as long as the threshold number of iterations has not been reached (exit branch N of the decision node 370), the user is prompted (or induced) to change the position of the user device UD and mmW connection attempt(s) based on the changed position are performed (action node 325 and decision nodes 330, 335).

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

Moreover, although in the foregoing explicit reference has been exemplary made to a user device as a connectable device, the principles of the present invention equivalently apply to other connectable devices or apparatuses other than user devices. Examples of such connectable devices or apparatuses comprise indoor and/or outdoor machines for industrial and/or domestic applications (such as industrial robots, warehouse robots, service robots, vacuum cleaning/floor washing robots) capable of communicating over mmW communication links, wherein the mmW communication links may fail due to obstacles encountered during movement of the machines.

In these applications, the notifications discussed above may also include indications or commands to move from a current location to another one, for example indications or commands to move from the current location to another one temporary (e.g., the time necessary to try to establish or restore a mmW communication link and allow the machine to download data, such as processing or task instructions).

The invention claimed is:

1. A method for exchanging digital content between a communication system and a connectable device connected thereto, wherein the communication system comprises a first base station configured to exchange the digital content over wireless communication links in a first frequency band, the frequencies of the first frequency band being higher than or equal to 6 GHz, and a second base station configured to exchange the digital content over wireless communication links in a second frequency band, the frequencies of the second frequency band being lower than 6 GHZ, the method comprising:

(i) determining a position of the connectable device;

(ii) causing the connectable device and the first base station to attempt to establish a wireless communication link in the first frequency band therebetween;

(iii) if the wireless communication link in the first frequency band has been successfully established, causing the first base station to exchange the digital content with the connectable device through the established wireless communication link in the first frequency band;

(iv) prompting a user of the connectable device to change the position of the connectable device within a coverage area of the first base station, if no wireless communication link in the first frequency band has been successfully established, wherein a signal from the connectable device, generated in response to acceleration and/or orientation changes sensed by at least one of an accelerometer or gyroscope of the connectable device, indicative of a change in the position of the connectable device and that is generated by the connectable device triggers at least one further attempt to establish the wireless communication link in the first frequency band, and (v) after step (iv), performing steps (ii) and (iii), wherein the wireless communication link in the first frequency band comprises at least one among:

a millimeter-wave communication link;

a submillimeter-wave communication link;

an optical communication link, such as an infrared, ultraviolet and/or visible light communication link, and a WiGig communication link.

2. The method according to claim 1, further comprising performing step (ii) until:

the wireless communication link in the first frequency band is established or a predetermined time period has elapsed.

3. The method according to claim 1, further comprising reiterating said steps (iv) and (v) until:

a threshold number of iterations has been reached.

4. The method according to claim 3, further comprising, if the threshold number of iterations has been reached and no wireless communication link in the first frequency band has been successfully established, causing the connectable device and the second base station to establish a wireless communication link in the second frequency band and causing the second base station to exchange the digital content with the connectable device through the established wireless communication link in the second frequency band.

5. The method according to claim 1, wherein said step (v) comprises performing step (i) before steps (ii) and (iii).

6. The method according to claim 1, wherein said step (ii) is performed after a determination that, according to the position of the connectable device determined at step (i), and according to historical information about historical wireless communication links in the first frequency band in that position, a successful wireless communication link in the first frequency band is expected to be established between the connectable device and the first base station.

7. The method according to claim 6, comprising:

if, according to the position of the connectable device determined at step (i), and according to the historical information about historical wireless communication links in the first frequency band in that position, no successful wireless communication link in the first frequency band is expected to be established between the connectable device and the first base station:

performing said prompting the user of the connectable device to change the position of the connectable device, and performing steps (ii) and (iii).

8. The method according to claim 6, wherein, for each position, the historical information comprises an indication about historical successful wireless communication links in the first frequency band that have been successfully established with the first base station in that position, and an indication about historical unsuccessful wireless communication links in the first frequency band that have been unsuccessfully established with that first base station in that position, wherein a successful wireless communication link in the first frequency band is expected to be established between the connectable device and the first base station if a number of historical successful wireless communication links in the first frequency band in that position is higher than the number of historical unsuccessful wireless communication links in the first frequency band in that position by a predefined amount.

9. The method according to claim 1, wherein the digital content comprises one or both between:

a file available at a communication network of the communication system, and ready to be downloaded upon access by the connectable device to said communication network;

a file pushed to the connectable device upon a predetermined condition being met.

10. The method according to claim 1, wherein said step (i) comprises determining a current position of the connectable device or an upcoming position of the connectable device.

11. The method according to claim 1, wherein the wireless communication link in the second frequency band comprises at least one among:

a cellular communication link, such as a cellular communication link established using one or more among UTRA, WCDMA, CDMA2000, GERAN, LTE, LTE-Advanced, and NR radio access technologies; and a Wi-Fi communication link.

12. The method according to claim 1, wherein the connectable device comprises:

a user device, such as a mobile phone, a smartphone, a tablet, a personal digital assistant (PDA), or a laptop computer, or an indoor and/or outdoor machine for industrial and/or domestic applications.

13. A communication system for exchanging digital content with a connectable device connected thereto, the communication system comprising:

a first base station configured to exchange the digital content over wireless communication links in a first frequency band, the frequencies of the first frequency band being higher than or equal to 6 GHz;

a second base station configured to exchange the digital content over wireless communication links in a second frequency band, the frequencies of the second frequency band being lower than 6 GHZ;

a communication network configured to:

(i) determine a position of the connectable device;

(ii) cause the connectable device and the first base station to attempt to establish a wireless communication link in the first frequency band therebetween;

(iii) if the wireless communication link in the first frequency band has been successfully established, causing the first base station to exchange the digital content with the connectable device through the established wireless communication link in the first frequency band;

(iv) prompt a user of the connectable device to change the position of the connectable device within a coverage area of the first base station, if no wireless communication link in the first frequency band has been successfully established, wherein a signal from the connectable device, generated in response to acceleration and/or orientation changes sensed by at least one of an accelerometer or gyroscope of the connectable device, indicative of a change in the position of the connectable device and that is generated by the connectable device triggers at least one further attempt to establish the wireless communication link in the first frequency band, and (v) after step (iv), perform steps (ii) and (iii), wherein the wireless communication link in the first frequency band comprises at least one among:

a millimeter-wave communication link;

a submillimeter-wave communication link;

an optical communication link, such as an infrared, ultraviolet and/or visible light communication link, and a WiGig communication link.

* * * * *